(12) United States Patent
Thomas (10) Patent No.: US 10,742,496 B2
(45) Date of Patent: Aug. 11, 2020

(54) PLATFORM SPECIFIC CONFIGURATIONS SETUP INTERFACE FOR SERVICE PROCESSOR

(71) Applicant: American Megatrends International, LLC, Norcross, GA (US)

(72) Inventor: Satheesh Thomas, Dunwoody, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 319 days.

(21) Appl. No.: 15/832,214

(22) Filed: Dec. 5, 2017

(65) Prior Publication Data
US 2019/0173749 A1 Jun. 6, 2019

(51) Int. Cl.
| | |
|---|---|
| G06F 9/451 | (2018.01) |
| G06F 9/44 | (2018.01) |
| G06F 11/32 | (2006.01) |
| H04L 12/24 | (2006.01) |
| G06F 9/4401 | (2018.01) |
| G06F 8/654 | (2018.01) |
| G06F 11/22 | (2006.01) |

(52) U.S. Cl.
CPC .......... *H04L 41/0813* (2013.01); *G06F 8/654* (2018.02); *G06F 9/4401* (2013.01); *G06F 9/451* (2018.02); *G06F 11/22* (2013.01); *H04L 41/0816* (2013.01); *H04L 41/0879* (2013.01); *H04L 41/32* (2013.01); *H04L 41/0213* (2013.01)

(58) Field of Classification Search
CPC ............. H04L 41/0813; H04L 41/0816; H04L 41/0879; H04L 41/32; G06F 9/451; G06F 9/4401; G06F 11/32
See application file for complete search history.

(56) References Cited

U.S. PATENT DOCUMENTS

| | | | |
|---|---|---|---|
| 7,975,084 B1 * | 7/2011 | Kalbarga | G06F 13/102 710/104 |
| 8,405,603 B2 * | 3/2013 | Kelley | G06F 1/3203 345/156 |
| 9,015,457 B2 * | 4/2015 | Nadon | G06F 8/60 713/1 |
| 9,281,999 B2 * | 3/2016 | Ayanam | H04L 41/0803 |
| 10,514,930 B2 * | 12/2019 | Xiao | G06F 11/22 |

* cited by examiner

*Primary Examiner* — Stefan Stoynov
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a service processor. The service processor generates a user interface on the service processor. The user interface providing access to platform specific configurations of the service processor. The service processor receives, through the user interface, an input for modifying a first configuration data item of the platform specific configurations. The service processor accordingly modifies the first configuration data item in accordance with the input.

17 Claims, 6 Drawing Sheets

PLATFORM SPECIFIC CONFIGURATIONS SETUP INTERFACE FOR SERVICE PROCESSOR

BACKGROUND

Field

The present disclosure relates generally to computer systems, and more particularly, to a service processor that provides a setup interface for modifying platform specific configurations of the service processor.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

Bringup is an early stage in designing a service processor where the platform of the service processor is made up and running for the first time (with minimal functions). Often bringup involves a hardware aspect as well as a firmware aspect. Hardware components of the service processor need to be configured to run the firmware. Configurations such as functionality of the hardware pins may be changed. Current tools require making changes in every boot and cannot be used for testing behavior like at the time of power on reset. Therefore, there is a need for a mechanism that allows convenient re-configurations of the components of the service processor.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a service processor. The service processor generates a user interface on the service processor. The user interface providing access to platform specific configurations of the service processor. The service processor receives, through the user interface, an input for modifying a first configuration data item of the platform specific configurations. The service processor accordingly modifies the first configuration data item in accordance with the input.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
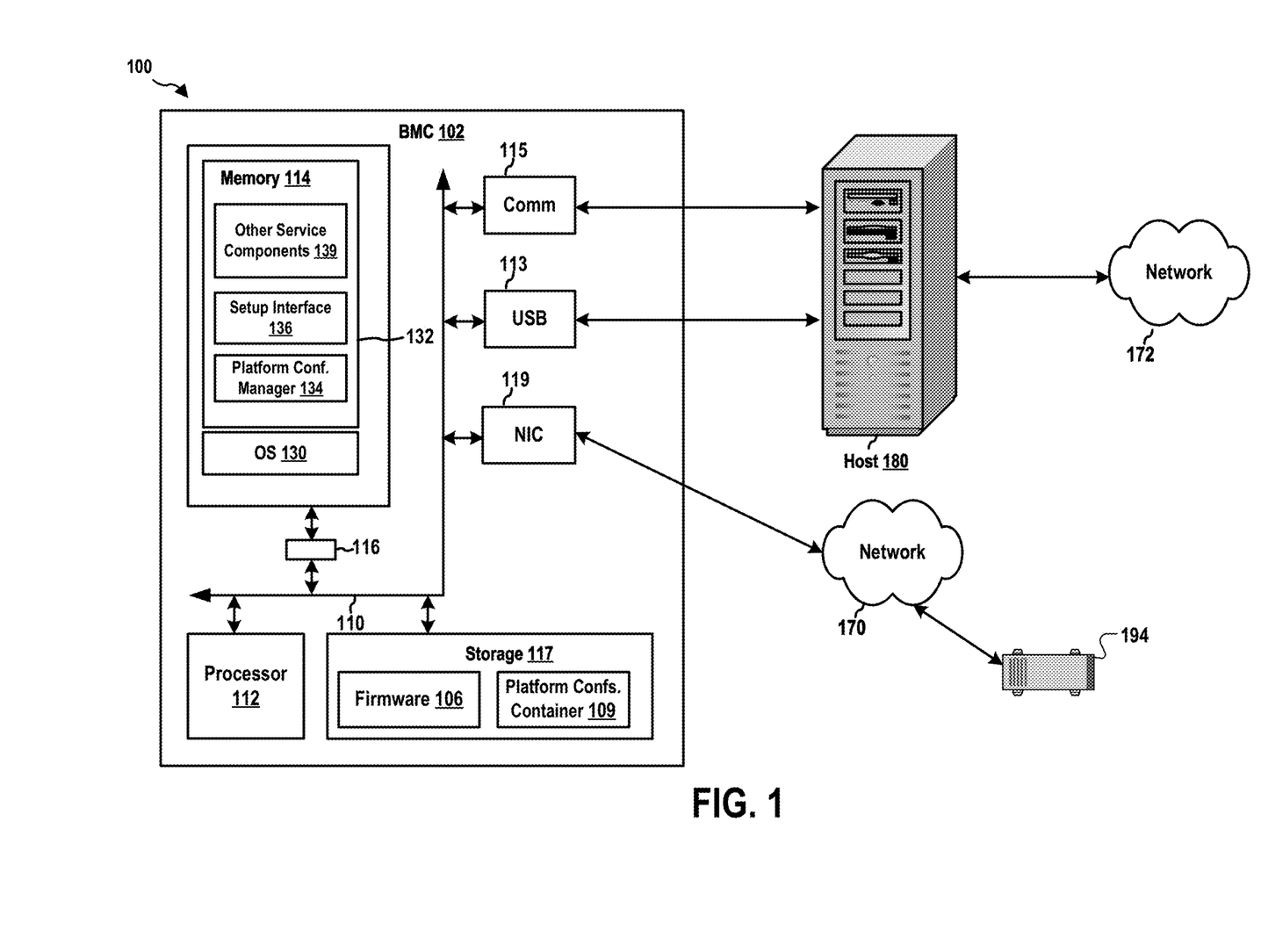
FIG. 1 is a diagram illustrating a computer system.

FIG. 1 is a diagram 100 illustrating a computer system. In this example, the computer system includes, among other devices, a BMC 102 and a host computer 180. The BMC 102 has, among other components, a processing unit 112, a memory 114, a memory driver 116, a storage 117, a network interface card 119, a Universal Serial Bus (USB) interface 113, and other communication interfaces 115.

The communication interfaces 115 may include a keyboard controller style (KCS), a server management interface chip (SMIC), a block transfer (BT) interface, a system management bus system interface (SSIF), and/or other suitable communication interface(s). Further, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the USB interface 113, and/or the communication interfaces 115 may be on the same chip. In addition, the memory 114, the processing unit 112, the memory driver 116, the storage 117, the communication interfaces 115, and/or the network interface card 119 may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an operating system (OS) 130 and service components 132. The service components 132 include, among other components, a platform specific configurations manager 134 and a setup interface 136. The service components 132 may also include other service components 139 such as IPMI components. Further, the service components 132 may be implemented as a service stack. As such, the BMC firmware 106 provides an embedded system to the BMC 102.

Further, the storage 117 may also include a platform specific configurations container 109 (e.g., a folder of a file system) that stores platform specific configurations used by the BMC firmware 106 (e.g., an initiation program) to initialize and set up the system platform (e.g., hardware components) of the BMC 102.

The BMC 102 may be in communication with the host computer 180 through the USB interface 113, the network interface card 119, the communication interfaces 115, and/or the IPMI interface. The host computer 180 includes various components including one or more host services. The service stack of the BMC 102 may manage the host computer 180 and is responsible for managing and monitoring the server vitals such as temperature and voltage levels. The service stack can also facilitate administrators to remotely access and manage the host computer 180. In particular, the BMC 102 may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and out-of-band to the data network 172. In certain configurations, the communication network 170 may not be connected to the Internet. In certain configurations, the communication network 170 may be in communication with the data network 172 and/or the Internet. In addition, through the communication network 170, a remote device 194 may communicate with the BMC 102. For example, the remote device 194 may send IPMI messages to the BMC 102 over the communication network 170.

Figure 2:
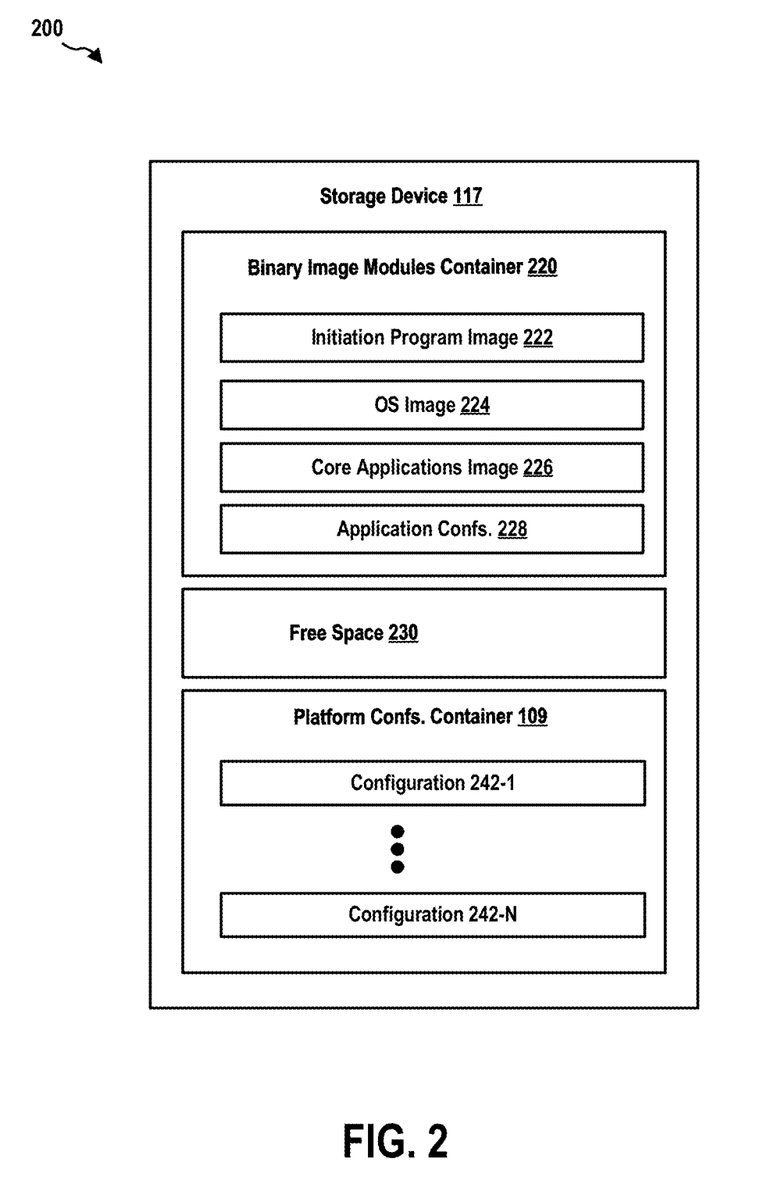
FIG. 2 is a diagram illustrating a configuration of a storage device of a service processor of the computer system.

FIG. 2 is a diagram 200 illustrating a configuration of the storage 117. In this example, the storage 117 includes a binary image modules container 220, a free space 230, and the platform specific configurations container 109. The binary image modules container 220 contains, among other components, an initiation program image 222, an OS image 224, a core applications image 226, and applications configurations 228. The platform specific configurations container 109 contains configuration data items 242-1 to 242-N that specify configurations of components of the BMC 102.

When the BMC 102 is powered on or reset, the processing unit 112 initially loads code and data from the initiation program image 222 into the memory 114 to execute an initiation program including a boot loader. The initiation program runs an initialization process that includes configuring the platform components (e.g., hardware components) of the BMC 102. To configure a particular component, the initiation program reads one or more configuration data items of the configuration data items 242-1 to 242-N corresponding to that component from the particular file or location (e.g., config_file_1) in the platform specific configurations container 109. The initiation program then configures the component according to the one or more configuration data items. For example, the initiation program may need to configure the processing unit 112 to use a particular pin as a general-purpose input/output (GPIO) pin. A configuration data item (e.g., the configuration data item 242-1) stored in the platform specific configurations container 109 may indicate a particular pin (e.g., pin no. 3) of the processing unit 112 that is to be used as a GPIO pin. Accordingly, the initiation program configures the processing unit 112 to use that pin as a GPIO pin.

Subsequently, the initiation program loads code and data from the OS image 224 to run the OS 130. After the OS 130 is up and running, the OS 130 can load code and data, based on configurations or user instructions, from the core applications image 226 to run the service components 132 on the OS 130.

Further, in this example, the platform specific configurations manager 134 is executed after the OS 130 has been booted up. The platform specific configurations manager 134 manages the configuration data items 242-1 to 242-N contained in the platform specific configurations container 109. Further, the platform specific configurations manager 134 provides a setup interface 136 that can be used by a user or device to access and to modify the configuration data items 242-1 to 242-N.

Figure 3:
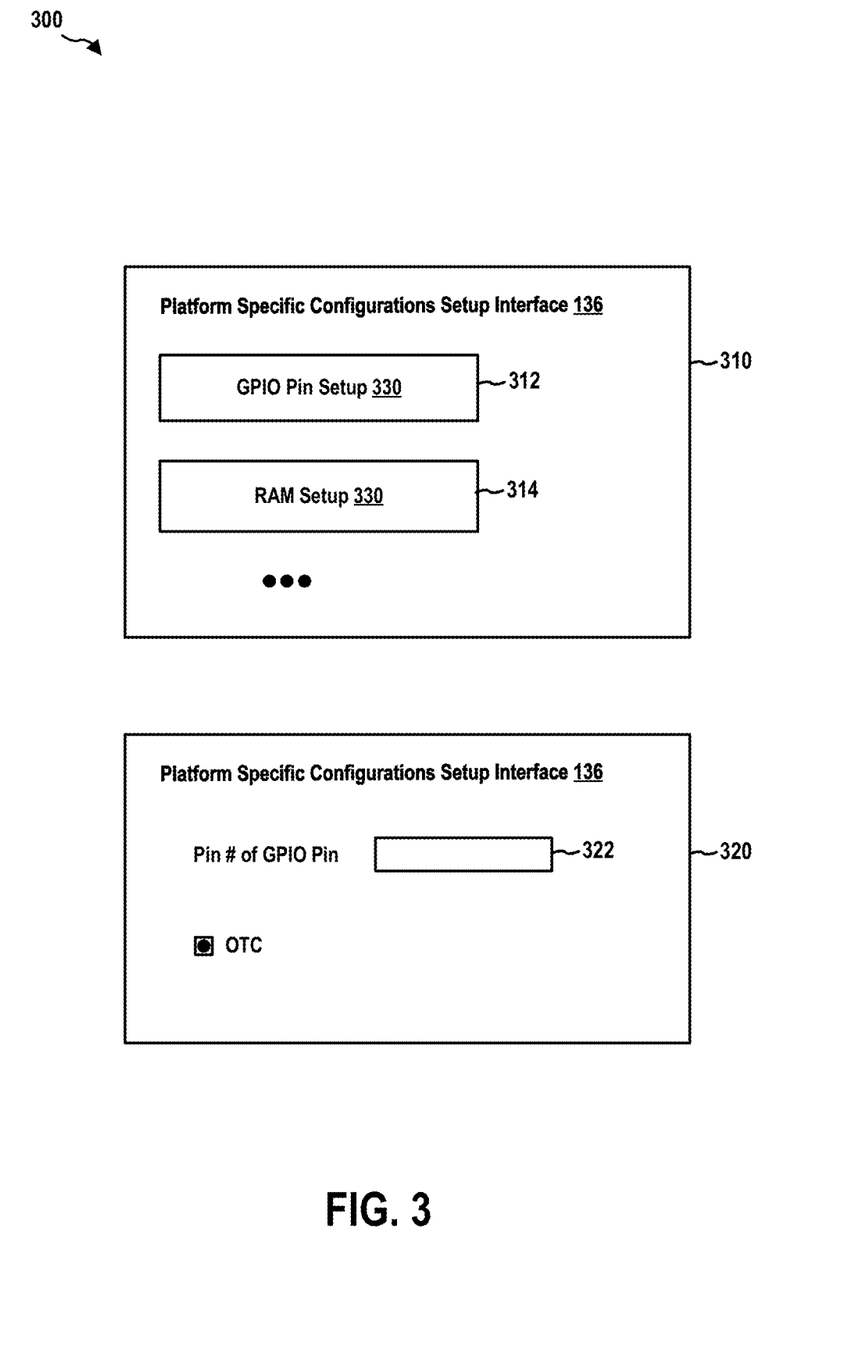
FIG. 3 is a diagram illustrating two interface displays of an exemplary setup interface provided by the service processor.

FIG. 3 is a diagram 300 illustrating two interface displays of an exemplary setup interface 136. When the platform specific configurations manager 134 initially launches the setup interface 136, the setup interface 136 displays an interface display 310. The interface display 310 can present one or more options for modifying configuration data items stored in the platform specific configurations container 109. In this example, the interface display 310 shows a GPIO pin setup option 312 and a RAM setup option 314, which, when selected, bring up another interface display that allows a user or device to modify a corresponding configuration data item. Of course, in other examples the interface display 310 can show other setup options.

In this example, the GPIO pin setup option 312 is selected. Accordingly, the platform specific configurations manager 134 receives from the setup interface 136 an indication of the selection and, in response, instructs the setup interface 136 to display an interface display 320. The interface display 320 includes an input field 322 through which a user or device can input the identity (e.g., the pin no. 3) of the pin of the processing unit 112 that is to be configured as a GPIO pin. After receiving the input through the input field 322, the setup interface 136 sends the input to the platform specific configurations manager 134. Based on the input, the platform specific configurations manager 134 updates the value of a corresponding one of the configuration data items 242-1 to 242-N (e.g., the configuration data item 242-1).

Each one of the configuration data items 242-1 to 242-N may be at a predetermined location or in a predetermined file of the platform specific configurations container 109. Each one of the configuration data items 242-1 to 242-N includes configuration data or value for a corresponding component of the BMC 102.

As described supra, during each re-boot, the initiation program configures, during the initiation process, one or more components of the BMC 102. When configuring a particular component, the initiation program obtains a corresponding configuration data item for the particular component from the platform specific configurations container 109 and further configures the particular component based on the configuration data item. In this example, when the initiation program attempts to configure the GPIO pin on the processing unit 112, the initiation program obtains the configuration data item 242-1 from the platform specific configurations container 109. Then the initiation program configures the GPIO pin of the processing unit 112 in accordance with the configuration data item 242-1.

In certain configurations, when a user configures a configuration data item through the setup interface 136, the setup interface 136 allows the user to indicate that the configured configuration data item is for one time use only; that is, the configuration data item is a one time configuration (OTC). In this example, the interface display 320 may show a check box through which a user can indicate that the configuration data item configured through the input field 322 is a one time configuration. The platform specific configurations manager 134 my store the indication at a predetermined location or in a predetermined file in the platform specific configurations container 109. Further, when the platform specific configurations manager 134 receives an input for a configuration data item indicated as a one time configuration, prior to replacing the current value of the configuration data item with the input value, the platform specific configurations manager 134 stores the current value of the configuration data item at a predetermined location/file of the platform specific configurations container 109 for re-use after the one time re-boot.

In this scenario, during a re-boot, when configuring a particular component, the initiation program obtains a configuration data item for the particular component from the platform specific configurations container 109 and accordingly configures the particular component. The initiation program also reads the OTC indications from the predetermined location or file in the platform specific configurations container 109 to determine whether the present configuration data item is a one time configuration. When the present configuration data item is a one time configuration, after configuring the particular component according to the value of the configuration data item, the initiation program restores the value of the configuration data item to its previous value stored in the platform specific configurations container 109 as described supra. Therefore, in a subsequent re-boot, the particular component is to be configured in accordance with the previous value.

Further, in certain configurations, after configuring a component based on the configuration data item in the platform specific configurations container 109, the initiation program may further determine whether that component is operating correctly. Further, in this configuration, the platform specific configurations container 109 may also have a set of default configuration data items at a predetermined location. Therefore, when the initiation program detects an error of the component, the initiation program can replace the value of the configuration data item with the value of the default configuration data items. The initiation program may also trigger a re-boot. As such, the particular component can be restored to a default configuration based on the value of the default configuration data items. In certain configurations, the OS 130 or a component of the service components 132 can also detect errors of the components of the BMC 102 and can, accordingly, instruct the platform specific configurations manager 134 to restore the corresponding configuration data items to their default values.

In certain configurations, after the BMC 102 is booted up, the platform specific configurations manager 134, running on the OS 130, can determine whether one or more components of the BMC 102 have been initiated successfully and is running correctly. When a component has been initiated successfully and is running correctly, the platform specific configurations manager 134 may, e.g., under the instruction of a user, remove the corresponding configuration setup option for that component. For example, when the platform specific configurations manager 134 determines that the GPIO pin has been set correctly, the platform specific configurations manager 134 can, e.g., under the instruction of an administrator, remove the GPIO pin setup option 312 from the interface display 310 to prevent further modifications.

In certain configurations, the platform specific configurations manager 134 can retrieve all configuration data items 242-1 to 242-N from the platform specific configurations container 109 and send the retrieved data to another BMC. The platform specific configurations manager of the other BMC, upon receiving the data, can replace the data of the other BMC with the received data. As such, the components of the other BMC can be configured based on the configuration data items of the BMC 102.

Figure 4:
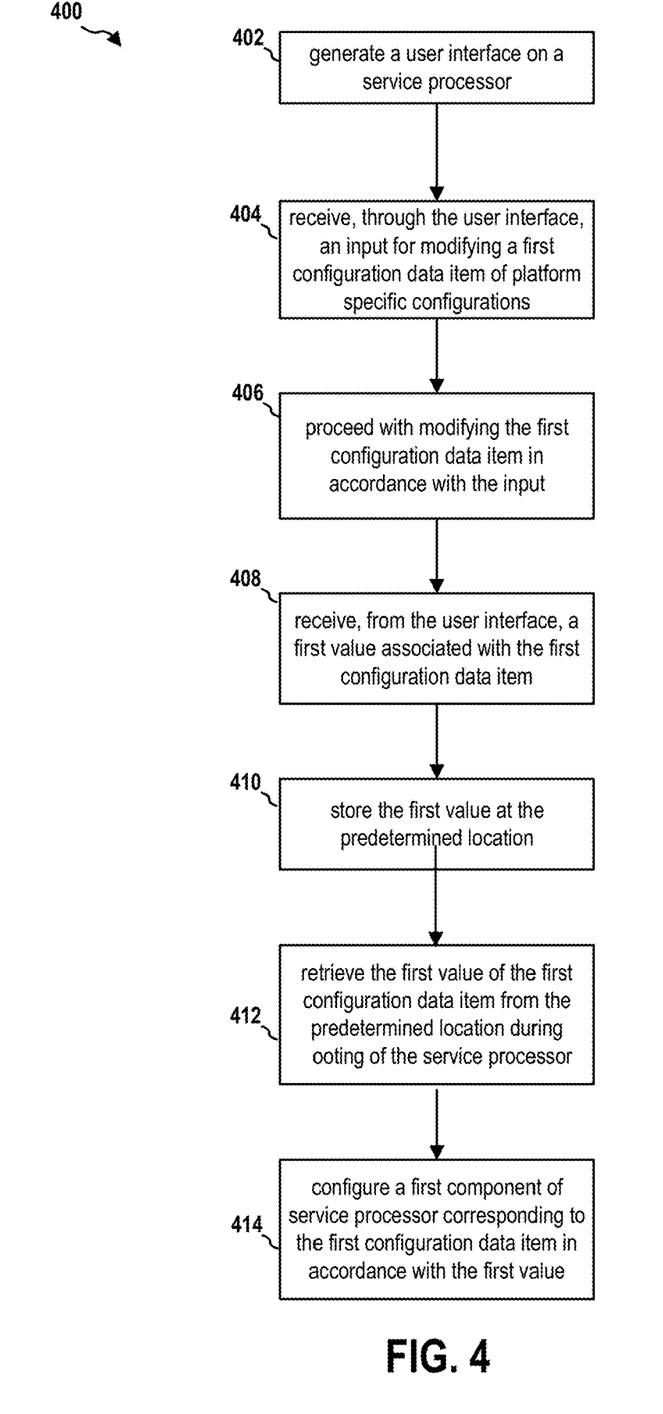
FIG. 4 is a flow chart 400 of a method (process) for modifying platform specific configurations.

FIG. 4 is a flow chart 400 of a method (process) for modifying platform specific configurations. The method may be performed by a service processor (e.g., the BMC 102, the apparatus 102'). At operation 402, the service processor generates a user interface (e.g., the setup interface 136) on the service processor. The user interface provides access to platform specific configurations (e.g., the configuration data items 242-1 to 242-N) of the service processor. At operation 404, the service processor receives, through the user interface, an input for modifying a first configuration data item of the platform specific configurations. At operation 406, the service processor proceeds with modifying the first configuration data item in accordance with the input. At operation 408, the service processor receives, from the user interface, a first value associated with the first configuration data item. At operation 410, the service processor stores the first value at the predetermined location.

In certain configurations, the first configuration data item specifies a particular pin connection of a processing unit of the service processor. In certain configurations, the platform specific configurations are stored at a predetermined location of a storage device of the service processor.

At operation 412, the service processor retrieves the first value of the first configuration data item from the predetermined location during booting of the service processor. At operation 414, the service processor configures a first component of the service processor corresponding to the first configuration data item in accordance with the first value.

In certain configurations, the service processor retrieves the platform specific configurations from the predetermined location. The service processor sends the platform specific configurations to another device.

In certain configurations, the service processor indicates that the first value of the first configuration data item is for one time use when the value is stored. The service processor removes the first value from the predetermined location after configuring the first component.

In certain configurations, the service processor detects an error during the booting after the configuring the first component in accordance with the first value. The service processor replaces the first value with a second value for the first configuration data item at the predetermined location, the second value is a default value of the first configuration data item.

In certain configurations, the service processor determines that the configuration of the first component is successful. The service processor removes, e.g., under the instructions of a user, an access point on the user interface provided for modifying the first configuration data item corresponding to the first component.

Figure 5:
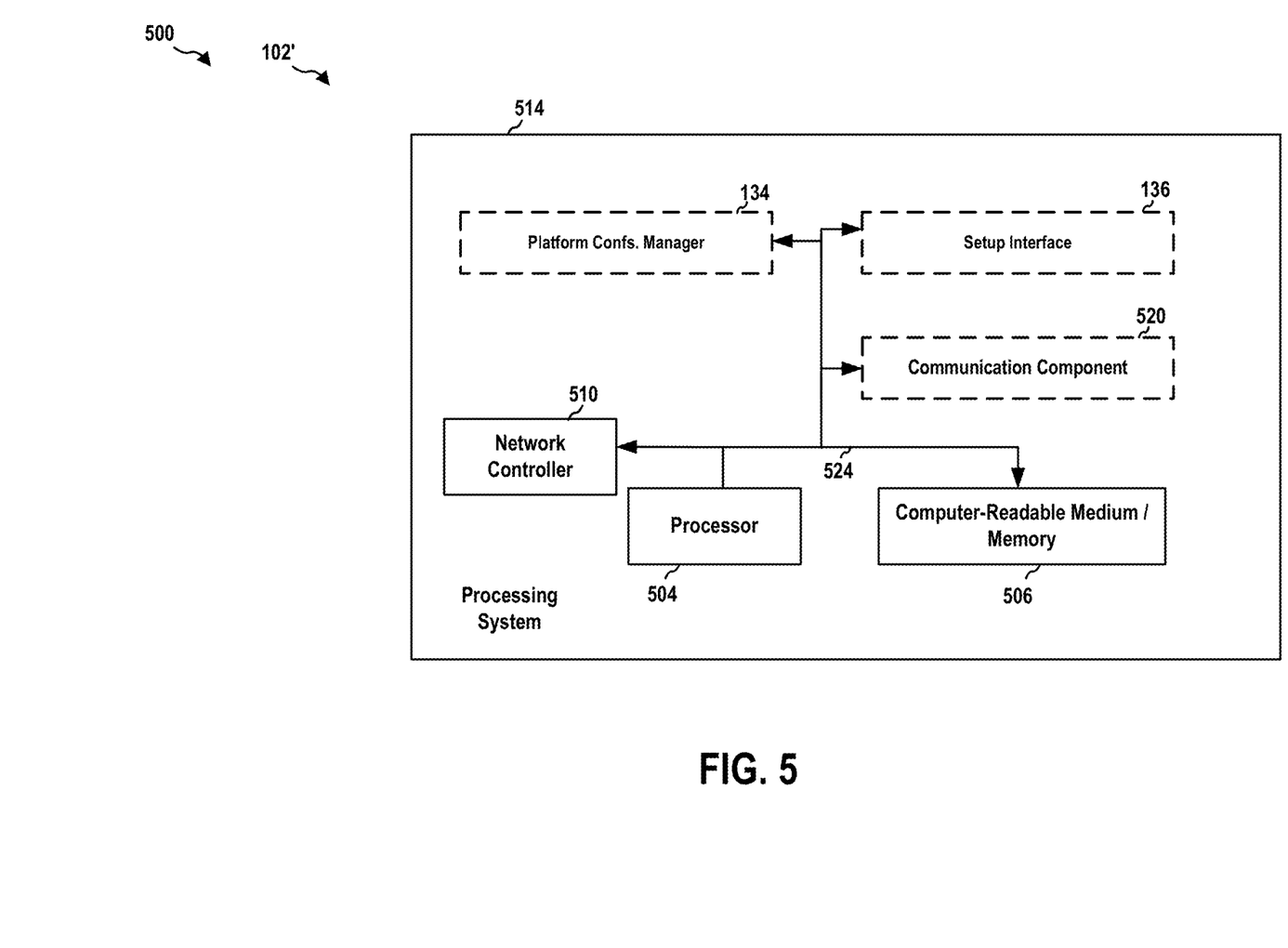
FIG. 5 is a diagram illustrating an example of a hardware implementation for an apparatus employing a processing system.

FIG. 5 is a diagram 500 illustrating an example of a hardware implementation for an apparatus 102' employing a processing system 514. The apparatus 102' may implement the BMC 102. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the computer-readable medium/memory 506, a network controller 510, etc.

The computer-readable medium/memory 506 may include the memory 114 and/or the storage 117. The bus 524 may also link various other circuits such as timing sources, peripherals, voltage regulators, and power management circuits, which are well known in the art, and therefore, will not be described any further.

The processing system 514 may be coupled to the network controller 510. The network controller 510 provides a means for communicating with various other apparatus over a network. The network controller 510 receives a signal from the network, extracts information from the received signal, and provides the extracted information to the processing system 514, specifically a communication component 520 of the apparatus 102'. In addition, the network controller 510 receives information from the processing system 514, specifically the communication component 520, and based on the received information, generates a signal to be sent to the network. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system further includes at least one of the platform specific configurations manager 134 and the setup interface 136. The components may be software components running in the processor 504, resident/stored in the computer readable medium/memory 506, one or more hardware components coupled to the processor 504, or some combination thereof.

The apparatus 102' may be configured to include means for performing operations described supra referring to FIG. 4. The aforementioned means may be one or more of the aforementioned components of the apparatus 102 and/or the processing system 514 of the apparatus 102' configured to perform the functions recited by the aforementioned means.

Figure 6:
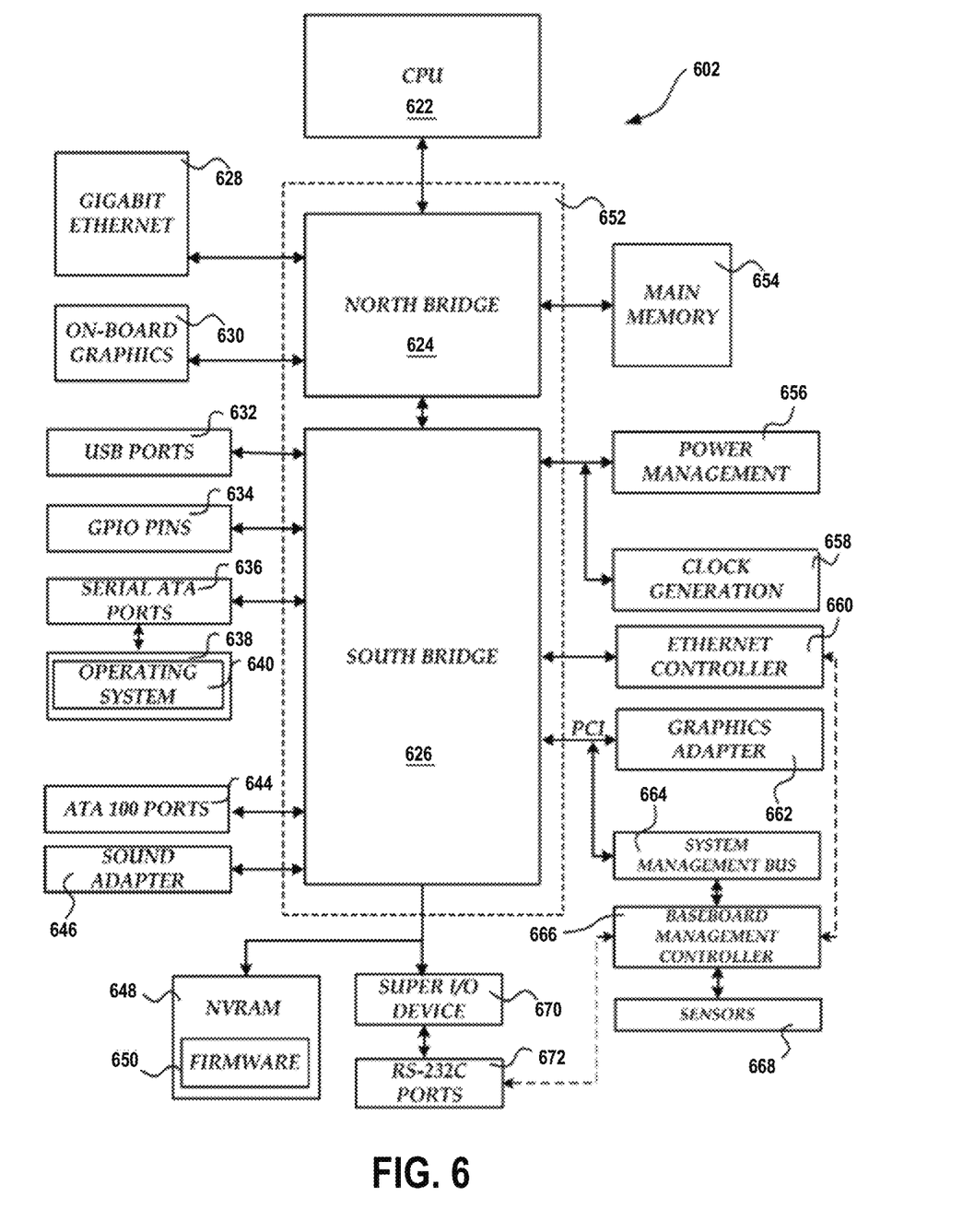
FIG. 6 shows a computer architecture for a computer.

FIG. 6 and the following discussion are intended to provide a brief, general description of one suitable computing environment in which aspects of the embodiments described herein may be implemented. In particular, FIG. 6 shows a computer architecture for a computer 602 that may be utilized to embody the host computer 180, as described supra. It should be appreciated that the computer architecture shown in FIG. 6 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 602 shown in FIG. 6 includes a baseboard, or "motherboard," which is a printed circuit board to which a multitude of components or devices may be connected by way of a system bus or other electrical communication path. In one illustrative embodiment, a CPU 622 operates in conjunction with a chipset 652. The CPU 622 is a standard central processor that performs arithmetic and logical operations necessary for the operation of the computer. The server computer 602 may include a multitude of CPUs 622.

The chipset 652 includes a north bridge 624 and a south bridge 626. The north bridge 624 provides an interface between the CPU 622 and the remainder of the computer 602. The north bridge 624 also provides an interface to a random access memory ("RAM") used as the main memory 654 in the computer 602 and, possibly, to an on-board graphics adapter 630. The north bridge 624 may also include functionality for providing networking functionality through a gigabit Ethernet adapter 628. The gigabit Ethernet adapter 628 is capable of connecting the computer 602 to another computer via a network. Connections which may be made by the network adapter 628 may include LAN or WAN connections. LAN and WAN networking environments are commonplace in offices, enterprise-wide computer networks, intranets, and the internet. The north bridge 624 is connected to the south bridge 626.

The south bridge 626 is responsible for controlling many of the input/output functions of the computer 602. In particular, the south bridge 626 may provide one or more USB ports 632, a sound adapter 646, an Ethernet controller 660, and one or more GPIO pins 634. The south bridge 626 may also provide a bus for interfacing peripheral card devices such as a graphics adapter 662. In one embodiment, the bus comprises a PCI bus. The south bridge 626 may also provide a system management bus 664 for use in managing the various components of the computer 602. Additional details regarding the operation of the system management bus 664 and its connected components are provided below.

The south bridge 626 is also operative to provide one or more interfaces for connecting mass storage devices to the computer 602. For instance, according to an embodiment, the south bridge 626 includes a serial advanced technology attachment ("SATA") adapter for providing one or more SATA ports 636 and an ATA 100 adapter for providing one or more ATA 100 ports 644. The SATA ports 636 and the ATA 100 ports 644 may be, in turn, connected to one or more mass storage devices such as the SATA disk drive 638 storing an operating system 640 and application programs.

As known to those skilled in the art, an operating system 640 comprises a set of programs that control operations of a computer and allocation of resources. An application program is software that runs on top of the operating system software, or other runtime environment, and uses computer resources to perform application specific tasks desired by the user. According to one embodiment of the invention, the operating system 640 comprises the LINUX operating system. According to another embodiment of the invention the operating system 640 comprises an operating system within the WINDOWS family of operating systems from MICROSOFT CORPORATION. According to another embodiment, the operating system 640 comprises the UNIX, LINUX, or SOLARIS operating system. It should be appreciated that other operating systems may also be utilized.

The mass storage devices connected to the south bridge 626, and their associated computer storage media, provide non-volatile storage for the computer 602. Although the description of computer storage media contained herein refers to a mass storage device, such as a hard disk or CD-ROM drive, it should be appreciated by those skilled in the art that computer storage media can be any available media that can be accessed by the computer 602.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer storage media such as a ROM or a flash memory such as a NVRAM 648 for storing the firmware 650 that includes program code containing the basic routines that help to start up the computer 602 and to transfer information between elements within the computer 602.

As described briefly above, the south bridge 626 may include a system management bus 664. The system management bus 664 may include a BMC 666. The BMC 666 may be the BMC 102. In general, the BMC 666 is a microcontroller that monitors operation of the computer system 602. In a more specific embodiment, the BMC 666 monitors health-related aspects associated with the computer system 602, such as, but not limited to, the temperature of one or more components of the computer system 602, speed of rotational components (e.g., spindle motor, CPU Fan, etc.) within the system, the voltage across or applied to one or more components within the system 602, and the available or used capacity of memory devices within the system 602. To accomplish these monitoring functions, the BMC 666 is communicatively connected to one or more components by way of the management bus 664. In an embodiment, these components include sensor devices 668 for measuring various operating and performance-related parameters within the computer system 602. The sensor devices 668 may be either hardware or software based components configured or programmed to measure or detect one or more of the various operating and performance-related parameters.

It should also be appreciated that the computer 602 may comprise other types of computing devices, including handheld computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a service processor, comprising:
   generating a user interface on the service processor, the user interface providing access to platform specific configurations of the service processor;
   receiving, through the user interface, an input for modifying a first configuration data item of the platform specific configurations, wherein the first configuration data item specifies a particular pin connection of a processing unit of the service processor; and
   modifying the first configuration data item in accordance with the input.

2. The method of claim 1, wherein the platform specific configurations are stored at a predetermined location of a storage device of the service processor, the modifying the first configuration data item further includes:
   receiving, from the user interface, a first value associated with the first configuration data item; and
   storing the first value at the predetermined location.

3. The method of claim 2, further comprising:
   retrieving the platform specific configurations from the predetermined location; and
   sending the platform specific configurations to another device.

4. The method of claim 2, further comprising:
   retrieving the first value of the first configuration data item from the predetermined location during booting of the service processor; and
   configuring a first component of the service processor corresponding to the first configuration data item in accordance with the first value.

5. The method of claim 4, further comprising:
   indicating that the first value of the first configuration data item is for one time use when the first value is stored; and
   removing the first value from the predetermined location after configuring the first component.

6. The method of claim 4, further comprising:
   detecting an error during the booting after the configuring the first component in accordance with the first value; and
   replacing the first value with a second value for the first configuration data item at the predetermined location, the second value is a default value of the first configuration data item.

7. The method of claim 4, further comprising:
   determining that the configuration of the first component is successful; and
   removing an access point on the user interface provided for modifying the first configuration data item corresponding to the first component.

8. An apparatus, the apparatus being a service processor, comprising:
   a memory; and
   at least one processor coupled to the memory and configured to:
   generate a user interface on the service processor, the user interface providing access to platform specific configurations of the service processor;
   receive, through the user interface, an input for modifying a first configuration data item of the platform specific configurations, wherein the first configuration data item specifies a particular pin connection of a processing unit of the service processor; and
   modify the first configuration data item in accordance with the input.

9. The apparatus of claim 8, wherein the platform specific configurations are stored at a predetermined location of a storage device of the service processor, wherein to modify the first configuration data item, the at least one processor is further configured to:
- receive, from the user interface, a first value associated with the first configuration data item; and
- store the first value at the predetermined location.

10. The apparatus of claim 9, wherein the at least one processor is further configured to:
- retrieve the platform specific configurations from the predetermined location; and
- send the platform specific configurations to another device.

11. The apparatus of claim 9, wherein the at least one processor is further configured to:
- retrieve the first value of the first configuration data item from the predetermined location during booting of the service processor; and
- configure a first component of the service processor corresponding to the first configuration data item in accordance with the first value.

12. The apparatus of claim 11, wherein the at least one processor is further configured to:
- indicate that the first value of the first configuration data item is for one time use when the first value is stored; and
- remove the first value from the predetermined location after configuring the first component.

13. The apparatus of claim 11, wherein the at least one processor is further configured to:
- detect an error during the booting after the configuring the first component in accordance with the first value; and
- replace the first value with a second value for the first configuration data item at the predetermined location, the second value is a default value of the first configuration data item.

14. The apparatus of claim 11, wherein the at least one processor is further configured to:
- determine that the configuration of the first component is successful; and
- remove an access point on the user interface provided for modifying the first configuration data item corresponding to the first component.

15. A non-transitory computer-readable medium storing computer executable code for operating a service processor, comprising code to:
- generate a user interface on the service processor, the user interface providing access to platform specific configurations of the service processor;
- receive, through the user interface, an input for modifying a first configuration data item of the platform specific configurations, wherein the first configuration data item specifies a particular pin connection of a processing unit of the service processor; and
- modify the first configuration data item in accordance with the input.

16. The non-transitory computer-readable medium of claim 15, wherein the platform specific configurations are stored at a predetermined location of a storage device of the service processor, wherein to modify the first configuration data item, the code is further configured to:
- receive, from the user interface, a first value associated with the first configuration data item; and
- store the first value at the predetermined location.

17. The computer-readable medium of claim 16, wherein the code is further configured to:
- retrieve the platform specific configurations from the predetermined location; and
- send the platform specific configurations to another device.

* * * * *